United States Patent [19]

McAllister et al.

[11] 4,409,361

[45] Oct. 11, 1983

[54] FIRE RETARDANT POLYMER RESIN

[75] Inventors: Lawrence E. McAllister, Saco; Herbert Dietrich, Kennebunk, both of Me.

[73] Assignee: Fiber Materials, Inc., Biddeford, Me.

[21] Appl. No.: 318,141

[22] Filed: Nov. 4, 1981

Related U.S. Application Data

[60] Continuation-in-part of Ser. No. 232,980, Feb. 9, 1981, abandoned, which is a division of Ser. No. 73,218, Sep. 7, 1979, Pat. No. 4,275,170, which is a continuation-in-part of Ser. No. 58,567, Jul. 18, 1979, abandoned.

[51] Int. Cl.³ .............................................. C08L 61/04
[52] U.S. Cl. ...................................... 524/876; 521/99; 521/122; 521/123; 521/181; 524/779; 524/789
[58] Field of Search .......................... 521/181; 260/38; 524/876, 779, 789

[56] References Cited

U.S. PATENT DOCUMENTS

| | | | |
|---|---|---|---|
| 3,830,894 | 8/1974 | Juenger et al. | 521/181 |
| 3,842,020 | 10/1974 | Garrett | 260/38 |
| 4,067,829 | 1/1978 | Garrett | 260/38 |
| 4,233,203 | 11/1980 | Baumgardt et al. | 260/38 |
| 4,235,762 | 11/1980 | Jinkins | 260/38 |

*Primary Examiner*—Morton Foelak
*Attorney, Agent, or Firm*—Schiller & Pandiscio

[57] ABSTRACT

A novel polymer is provided as the condensation reaction product of a non-aqueous mixture of a phenol and an aldehyde in a molar ratio of about 0.5 to 1 phenol to aldehyde, containing refractory fibers, such as carbon, graphite, silica, having an aspect and metal oxides and silicates, which fibers have an aspect ratio of about 10. The phenol is selected from metacresol, orthocresol, 3,5-dimethylphenol, resorcinol and substituted resorcinols, the preferred material being mostly resorcinol. The aldehyde is selected from furfural and mixtures of furfural and paraformaldehyde. The condensation polymerization reaction can be effected by adding an acid catalyst to the mixture or by employing a curing agent which provided a polyfunctional amine reactive with either or both the aldehyde and the phenol.

8 Claims, No Drawings

FIRE RETARDANT POLYMER RESIN

This application is a continuation-in-part of copending application Ser. No. 232,980 filed Feb. 9, 1981, now abandoned which is a division of application Ser. No. 73,218 filed Sept. 7, 1979 (now U.S. Pat. No. 4,275,170) which in turn was a continuation-in-part of application Ser. No. 058,567, filed July 18, 1979, now abandoned.

The present invention relates generally to flame-retardant polymer resins, and in particular to novel synthetic polymer resins which are self-extinguishing and non-punking upon exposure to flames. The invention also contemplates a novel process for producing novel synthetic polymer resins having the aforesaid characteristics. The invention has particular utility in connection with the preparation of synthetic polymer resins for use in thermal insulation systems such as foams, and will be described in detail in connection with such utility. However, the invention is not limited to the production of polymer foams as will become clear from the following description.

Various synthetic polymer resins are known in the art and have achieved substantial commercial utility. By way of example, polymer foams based on polyurethane and on polystyrene formulations have achieved substantial use in thermal insulation systems, but such foams per se are highly flammable. In order to reduce flammability of polyurethane and polystyrene-based polymer foams, it has been proposed to incorporate phosphorous and halogen containing additives into the foam formulations. While such modified polyurethane and polystyrene based polymer foams tend to be self-extinguishing, the resultant polymer foams generally produce toxic smoke when exposed to open flame. Moreover, some pyrolysis products of polyurethane and polystyrene-based polymer foams also are flammable, and may cause flash fires if they collect in a closed area. These and other problems and disadvantages have restricted wider commerical use of polyurethane and polystyrene based polymer foams in thermal insulation systems.

Polymer foams based on polyimides, polybenzimidazoles, polyphenylquinoxilines, pyrones, and other highly aromatic polymer materials have also been proposed for use in thermal insulation systems. While polymer foams based on such highly aromatic polymer materials are said to offer extremely high flame retardancy characteristics, none of these polymer foams is believed to have achieved any substantial degree of commercial utilization due to high raw materials cost. Special processing techniques and apparatus required for producing such foams limits their commercial use.

Polymer foams based on ureaformaldehyde and phenolformaldehyde have also been proposed for use in thermal insulating systems, and have achieved some degree of commercial utilization. Ureaformaldehyde and phenolformaldehyde polymers are relatively inexpensive, and can be foamed in situ using commercially available foaming apparatus. Ureaformaldehyde polymers exhibit good mechanical properties but generally generate relatively large quentities of smoke upon exposure to flame, and are susceptible to degradation in the presence of moisture. Polymers based on phenolformaldehyde also exhibit good mechanical properties, and in addition generally are stable in the presence of moisture. Moreover, polymer foams based on phenolformaldehyde exhibit relatively low flame spread and smoke generation on exposure to flames. On the other hand, polymer foams based on phenolformaldehyde generally suffer from so-called "afterglow" or "punking," a phenomenon that causes the foam to be consumed by flameless oxidation after exposure to a fire. While a number of investigators have proposed various solutions for making phenolic polymers non-punking, none of such solutions is believed to be entirely satisfactory. Many polymers utilized in insulating formulations employ alkali or alkaline earth materials as polymerization catalysts and it is believed that such materials may in fact contribute to combustion of the polymer.

It is thus a primary object of the present invention to provide new and improved synthetic polymer mixtures which overcome the aforesaid and other problems of prior art. Another object of the present invention is to provide new and improved polymer based materials for use in thermal insulation systems, which materials are characterized by low flame spread, low smoke generation, and resistance to afterglow or punking. Still another object of the present invention is to provide new and improved polymer materials of the type above-described which exhibit good mechanical properties and resistance to moisture. Still another object of the present invention is to provide a novel process for producing polymer materials having the aforesaid characteristics.

The invention accordingly comprises the processes involving the several steps and relative order of one or more such steps with respect to each other, and the materials and products possessing the features, properties and relations of elements which are exemplified in the following detailed disclosure and the scope of the application of which will be indicated in the claims.

Generally, in the practice of this invention, new phenolic resins based on phenol-aldehyde are derived as the reaction product of a non-aqueous, polyhydric phenol with a non-aqueous aldehyde, at least one of the two being highly soluble in the other to form a liquid resin. Fibers of a highly refractory material are mixed with the liquid resin. This resin mixture is neither a resole nor a novolak in the conventional sense inasmuch as it is mixed at room temperature without a catalyst. While the aldehyde and phenol enter into a condensation reaction, the reaction at room temperature in the absence of a catalyst is very slow, so the liquid resin/fiber mixture has a substantially long shelf life e.g. at least several months. The resin mixture is subsequently polymerized with an acid catalyst, an amine curing agent or both when it is desired to produce the final polymeric product.

Still other objects and many of the advantages of the present invention will become clear from the description following.

At the time of catalyzation, the novel polymer material of the present invention may be foamed by using polyhalogenated saturated fluorocarbons or other foaming agents in known manner using known production equipment, and may be cast as foamed board stock on continuous production equipment, or the polymer materials may be foamed in situ. Alternatively, the polymer material of the present invention may be formulated in appropriate weight for use as an unfoamed fire retardant coating, in a laminate, and the like.

More specifically, the aldehyde compounds used herein comprise a low molecular weight, non-aqueous unsaturated, liquid aldehyde such as furfuraldehyde (furfural) and non-aqueous liquid mixtures of furfural and paraformaldehyde. The polyhydric phenol comprises non-aqueous resorcinol and substituted resorcinols such as methyl resorcinol. Resorcinols have been found to provide polymers which are highly crosslinked and tend to be thermally stable. Methyl resorcinol, when used in the present invention, tends to produce a stronger, less friable polymer than resorcinol. Other phenols may be combined, such as phenol, metacresol, orthocresol, 3,5-dimethylphenol and the like, but with at least a minor amount (e.g. 25% or more by weight) of the polyhydric phenol present.

Furfuryl alcohol monomer behaves chemically in a manner similar to the initial reaction product between phenols and aldehydes, which product is also an alcohol. Therefore, from the standpoint of chemical stoichiometry of the resin system, one mole of furfuryl alcohol is the equivalent of one mole of a phenol and one mole of an aldehyde. Formulations of up to 50 weight % furfuryl alcohol in the overall resin have been prepared. Approximately 9.0 weight % is preferred from the standpoint of processing ease and final properties.

Certain mineral acids can be employed as polymerization catalysts in accordance with the present invention. Among such acids are phosphoric acid, phosphorous acid, sulphuric acid, hydrochloric acid and organic acid phosphates such as butyl phosphate and the like.

The non-aqueous resorcinol-furfural resin mixture can also be cured by adding amine curing agents which initiate crosslinking and polymerization of the resin while entering into the reaction itself. The particular amine selected will influence both the reactivity and the chemical structure of the final polymer. In general aliphatic amines are more reactive than aromatic amines and the lighter molecular weight amines of each type generally are more reactive than the heavier amine agents. The amine curing agents employed should be multifunctional to insure formation of polymeric structures from the resin. Aliphatic amines such as triethylenetetramine are the most reactive and will cause rapid polymerization at room temperature. Aromatic amines such as metaphenylenediamine are less reactive. Amine complexes can also serve as curing agents once they undergo thermal decomposition upon application of heat to the mixture to release amines. For example, hexamethylenetetramine is non-reactive or latent in the resin system of the present invention at room temperature, but can be thermally activated by raising the temperature of the mix to 150°–300° F. whereupon polymerization will occur. Such latent curing agents are particularly suited to prepreg systems or molding compounds where the resin mixture is impregnated into or combined with fabric or reinforcing fibers in advance, because polymerization will only commence upon application of heat during the molding operation. In most cases, the addition of a mineral acid catalyst together with the amine curing agent will serve to accelerate the cure of the resin.

Linear high molecular weight compounds such as an amine-terminated polyamide (e.g. material available under the trademark Versamid from General Mills Co.) can serve a dual role as both a curing agent and toughening agent in the present invention. Amine-terminated rubbers such as amine-terminated butadiene nitrile (available as the material sold under the trademark ATBN from B. H. Goodrich) are liquids that will also serve the same dual role.

It is believed that the amine curing agent enters into a Schiff base reaction with the aldehyde in the furfural-resorcinol mixture as follows:

$$R-CHO + R'-NH_2 \rightleftharpoons (R-CHOH-NH-R') \rightleftharpoons R-CH=NR' + H_2O$$

This particular reaction is spontaneous and exothermic and can be further catalyzed by mineral acid catalysts.

It is also believed that the amine curing agent also enters into a Mannich reaction with both the phenol and the aldehyde of the furfural-resorcinol mixture as follows:

$$RH + R'CHO + R''NH_2 \rightarrow R-R'-CH-R''NH + H_2O$$

This latter reaction can also be further catalyzed with a trace of mineral acid catalyst.

A method of producing a fire retardant resin, particularly useful for forming ablative materials, is exemplified by the formation of a liquid resin by direct mixture at room temperature of a phenol and aldehyde in the absence of water, followed or accompanied by the admixture of fibers of highly refractory materials, particularly fibers of silica, graphite or carbon.

Other refractories such as metal oxides and silicates are not as desirable inasmuch as they may melt at the temperatures of interest at which the final material is intended to be used, but being quite inexpensive, are acceptable depending on the desired temperature of interest. The fibers preferably have diameters in the range from about 3μ to 10μ with an aspect ratio of preferably not less than about 10. The preferred method of the present invention is to form a solution of resorcinol in furfural in molar ratios ranging from about 0.5 to 1, and mixing therein refractory fibers in an amount in the range between about 10 weight % and 70 weight %. As noted earlier, this mixture is stable at ordinary ambient temperatures and is essentially nonreactive until either a catalyst or curing agent is added.

In producing these coatings and composites, additives such as pigments may be combined with the resin/fiber mixture. When these additions are properly dispersed, the system is suitable for application. A catalyst system or curing agent is then added to initiate the polymerization reaction leading to a cured coating or composite. Any of the acid catalysts, catalyst combinations or curing agents described earlier herein are useful. The catalyst or curing agent should be however selected to provide a relatively slow ambient temperature polymerization without excessive exotherm. The resulting polymer constitutes an excellent ablative material.

The following examples, which are illustrative and not meant to be limiting, are given to provide an additional description of the invention. In order to test for fire resistance the resulting polymeric compositions were exposed to the cutting flame of an oxyacetylene torch.

EXAMPLE I

The preparation of a fire retardant ablative composite material is accomplished in the following manner: 1,641 g of furfural are mixed with 867 g of resorcinol at room temperature using a high shear mixer. To this non-aqueous resin mixture, 418 g of a refractory type fiber are added while the resin is being mixed. Ideally a Banbury or Hobart type mixer should be used for beating the fibers into the resin mix to minimize breakdown. These fibers may be carbon, graphite, silica, metal oxides and/or silicates; graphite fibers are preferred.

The resin-fiber mixture can be catalyzed by any of the previously mentioned acids or amine curing agents in sufficient quantity. However, one preferred catalyst consists of a mixture of 25 parts by weight of an phosphoric acid derivative such as PA-75, to 75 parts furfural. Typically up to 50 ml of the catalyst mixture will initiate a controllable room temperature cure within 24 hours. In this example, the resin/fiber batch is transferred into a gallon metal container and the catalyst is added. Uniform mixing of the catalyst and batch is achieved by immediately closing the metal container and shaking it for approximately five minutes on a gyratory type paint shaker. Alternatively, larger batches may be catalyzed using a rotating mortar mixer, or a Banbury or Hobart type mixer.

Such an ablative material as described above can be cast into moulded shapes using vibrating equipment or manual tamping of the mould. The density of the finished part can vary from 80 to 100 lbs/ft3 depending on the amount of entrained air that is removed during the casting process.

EXAMPLE II

In another example of an ablative material, up to 10 PHR (parts per hundred parts of resin) high surface area carbon black is added to the same resin/fiber mixture as described in Example I, prior to catalyzation. The carbon black absorbs excess resin during casting, minimizing resin run-out. In addition, the carbon black imparts a thixotropic nature to the resin allowing it to be troweled onto vertical surfaces without slumping or falling off.

EXAMPLE III

In yet another example of an ablative material of the present invention, a non-aqueous solution of furfural and resorcinol is prepared by mixing 235.5 g of furfural with 115.5 g of resorcinol as in Example I and an appropriate amount of fiber added. The mixture is then allowed to age at room temperature for 16 hours. From the aged mixture, aliquots of 25 g each are taken and to each such aliquot 4 PHR of an amine curing agent is added.

Where the agent was triethylenetetramine, observation of the mixture after two hours at room temperature indicated that the agent was not miscible. However, upon raising the temperature of the mixture for another hour, the agent became completely miscible and a rapid exothermic cure occurred.

Where the agent was hexamethylenetetramine, no reaction at all occurred during the first two hours at room temperature, and upon heating for one more hour to 150° F., a partial cure to a soft but solid mass occurred. Heating to 200° F. for yet another hour effected a full cure.

Where the agent was a eutectic blend of methylenedianiline and metaphenylenediamine, no reaction occurred during the first two hours at room temperature, but upon heating for one more hour at 150° F., the mixture became a semi-cured viscous liquid. Heating to 200° F. for yet another hour effected an exothermic cure.

Since certain changes may be made in the above products and methods without departing from the scope of the invention herein involved, it is intended that all matter contained in the above description shall be interpreted in an illustrative and not in a limiting sense.

What is claimed is:

1. Method of forming a flame retardant polymer resin, said method comprising the steps of:

mixing an initially non-aqueous substantially unreacted solution of a phenol in a liquid aldehyde in molar ratio of about 0.5 to 1 phenol to aldehyde, said phenol being selected from the group consisting of metacresol, orthocresol, 3,5-dimethylphenol, resorcinol and substituted resorcinols, said aldehyde being selected from the group consisting of furfural and mixtures of furfural and paraformaldehyde;

effecting condensation polymerization of said solution into said resin; and adding to said solution prior to polymerization, refractory fibers having an aspect ratio of greater than about 10, said fibers being selected from the group consisting of carbon, graphite, silica and metal oxides and silicates.

2. Method of forming a resin according to claim 1 wherein furfural alcohol is substituted on the basis of one mole of said furfuryl alcohol being chemically equivalent to one mole of said phenol and one mole of said aldehydes, up to 50% by weight of the final product.

3. Method of forming a resin according to claim 1 wherein said condensation polymerization is effected by addition of an acid catalyst in sufficient amount to produce said polymerization.

4. Method of forming a resin according to claim 1 wherein said condensation polymerization is effected by addition of a polyfunctional amine curing agent in sufficient amount to produce said polymerization.

5. Method of forming a resin according to claim 1 wherein said condensation polymerization is effected by the addition of said solution of heat and a latent amine complex curing agent which undergoes thermal decomposition to release a polyfunctional amine upon addition of said heat.

6. Method of forming a resin according to claim 4 wherein said acid catalyst is selected from the group consisting of phosphoric acid, phosphorous acid, sulfuric acid, hydrochloric acid and organic acid phosphates.

7. Method of forming a resin according to claim 4 wherein said curing agent is selected from both aliphatic and aromatic amines.

8. Method of forming a resin according to claim 5 wherein said latent curing agent is an amine complex.

* * * * *

UNITED STATES PATENT AND TRADEMARK OFFICE
CERTIFICATE OF CORRECTION

PATENT NO. : 4,409,361
DATED : October 11, 1983
INVENTOR(S) : Lawrence E. McAllister et al.

It is certified that error appears in the above-identified patent and that said Letters Patent is hereby corrected as shown below:

Column 6, claim 5, line 47, "of", first occurrence should read -- to --.

Column 6, claim 6, line 51, "4" should read -- 3 --.

*Signed and Sealed this*

*Twentieth* Day of *December 1983*

[SEAL]

*Attest:*

GERALD J. MOSSINGHOFF

*Attesting Officer*     *Commissioner of Patents and Trademarks*